United States Patent [19]

Klein

[11] Patent Number: 4,750,350

[45] Date of Patent: Jun. 14, 1988

[54] COMBUSTION LEAK TESTER

[76] Inventor: Lawrence W. Klein, Rte. 1, Alhambra, Ill. 62001

[21] Appl. No.: 16,191

[22] Filed: Feb. 17, 1987

[51] Int. Cl.$^4$ .................. G01M 3/10; G01M 3/06
[52] U.S. Cl. ........................... 73/49.7; 73/49.2
[58] Field of Search ............ 73/49.7, 45.8, 40, 37, 73/49.2, 116, 49.8

[56] References Cited

U.S. PATENT DOCUMENTS

| | | | |
|---|---|---|---|
| 3,266,297 | 8/1966 | Powers | 73/49.7 |
| 4,102,178 | 7/1978 | Mercik, Jr. et al. | 73/49.7 |
| 4,235,100 | 11/1980 | Branchini | 73/49.7 |
| 4,259,677 | 3/1981 | Koch | 346/124 |
| 4,312,215 | 1/1982 | Dobler | 73/35 |
| 4,354,379 | 10/1982 | Miner | 73/37 |
| 4,475,382 | 10/1984 | Frank | 73/116 |
| 4,667,507 | 5/1987 | Ericksson | 73/49.7 |

FOREIGN PATENT DOCUMENTS 1387192 12/1964 France ............................ 73/40

Primary Examiner—Stewart J. Levy
Assistant Examiner—Hezron E. Williams
Attorney, Agent, or Firm—Don W. Weber

[57] ABSTRACT

This invention relates to a portable combustion leak tester for water-cooled internal combustion engines. The tester comprises a top cap, a transparent, hollow sightglass attached to the bottom of the cap and a frustro-conical bottom nose-cone attached to the bottom of the sightglass adapted to fit into a radiator inlet. The tester has a longitudinal air-passageway therethrough with a check-ball chamber and check-ball located in the upper portion of the nose-cone. The tester is supplied with water through an upper passageway filled so that approximately one inch of water fills the sightglass. The device is then secured to the radiator filling mouth. If there are pressure leaks from the combustion chamber of the engine into the cooling jacket. When the engine is running, air bubbles can be observed in the sightglass.

5 Claims, 1 Drawing Sheet

COMBUSTION LEAK TESTER

BACKGROUND OF THE INVENTION

Most cars and trucks and other vehicles today utilize watercooled internal combustion engines. The cooling systems typically surround the combustion portions of the engine. If the engine has a cracked head, cracked block or has a faulty head gasket, then the pressure built up in the combustion chamber will leak into the cooling jacket and will create pressure in the for of bubbles in the water in the cooling system when the engine is operating. Since pressures in the combustion chamber are many times the normal (25-30 psi) pressures under which most cooling systems operate, the added pressure will force the engine coolant out of the coolant overflow pipe since the radiator cap cannot hold the tremendous added pressure in the cooling system. This coolant loss will eventually cause the engine to overheat.

Another serious problem brought on by undetected and uncorrected combustion pressure leaks is that water will eventually begin to pass into the combustion chamber from the water jacket. At that time, the water and anti-freeze coolant will mix with the engine oil lubricating the combustion compartment and parts. This degradation in the lubrication system will destroy rod bearings, main bearings, cam bearings, the crankshaft cylinder walls and pistons of an engine. The obvious dire consequences of this would be the total destruction of the engine.

Leak detection devices have been created, but are generally expensive and complicated to use. Generally, these devices utilize the principle that leaks in the combustion chamber or cooling system can be determined by pressurizing the cooling system and applying a pressure guage to monitor the pressure leaks. An example of this type of device is U.S. Pat. No. 4,235,100, the Branchini Patent. The Branchini system is a comprehensive coolant system tester. The instant device uses the same principle, i.e. a leak in the head, block or gaskets will allow pressure flow between the cooling jacket and the combustion chamber. However, unlike other devices, our invention detects combustion pressure leaking into the cooling system.

BRIEF SUMMARY OF THE INVENTION

This invention was devised to detect a leak from the combustion compartment of an internal combustion engine to the cooling water jacket located adjacent to the combustion compartment. The tool consists of essentially three parts: an upper cap, a middle transparent sightglass and a lower nose-cone. Located within the nose-cone is a check-ball and check-ball chamber.

To use the tester, the radiator is first drained of approximately two inches of water so that approximately two inches of air space exists between the bottom of the radiator filling neck and the water level. The radiator filling neck is the conduit connecting the radiator filling mouth to the interior of the radiator water cavity. The engine should be cool.

The nose-cone is tapered downwardly and inwardly so that when the device is inserted into the radiator filling neck in place of the radiator cap, the bottom of the nose-cone will be projected into the radiator cavity.

The bottom of the tester will be slightly above the water level in the radiator cavity. The device should be held in place by hand so as to sealedly connect the nose-cone to the filling neck mouth. The frustro-conical shape of the bottom of the nose-cone is made of such a material so as to sealedly connect to the filling mouth of the radiator. The transparent sightglass is then filled with water which is poured in through the longitudinal passageway in the top cap. The test is then ready to begin.

The engine is turned on and combustion begins within the engine compartment. If there is leakage between the engine block, head or head gasket and the water jacket, the tremendous pressure built up in the combustion process will create air bubbles in the radiator cavity and eventually force the check-ball up. This in turn will allow air bubbles to emerge in the water in the sightglass. The more bubbles that appear in the sightglass, the more leakage is detected. If no bubles are present in the sightglass, then one may assume that the block, head and head gasket are in sound working order. If a constant stream of bubbles is observed, the engine is in need of immediate repair. If the bubbles observed are small and intermittent, a temporary repair with a block sealer or similar repair device could be utilized while awaiting permanent repairs.

DETAILED DESCRIPTION OF THE PREFERRED EMBODIMENT

Figure 1:
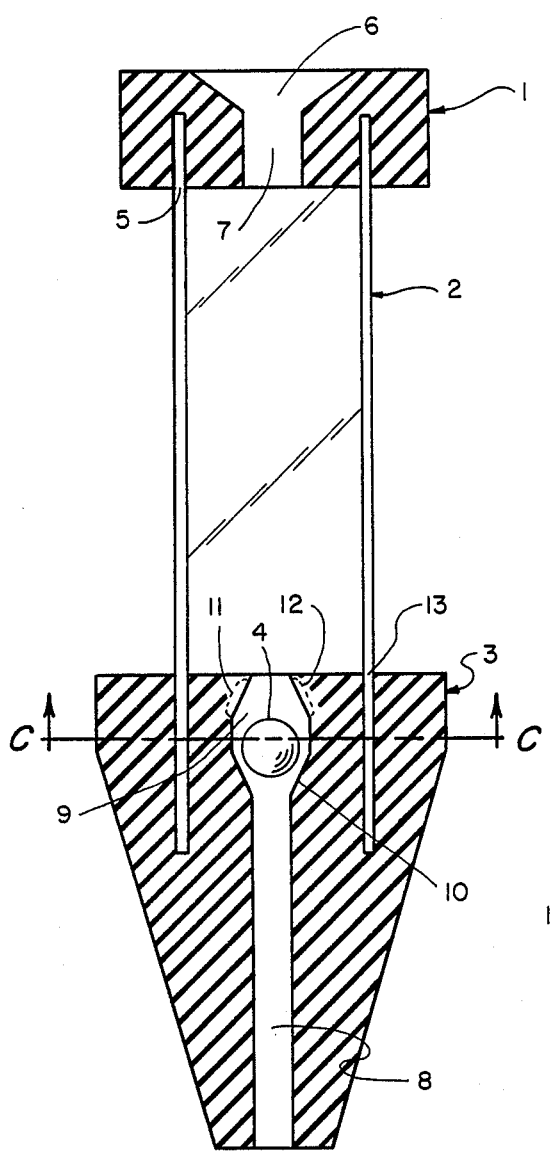
FIG. 1 shows a cross-sectional cut-away view of the Combustion Leak Tester.
Figure 5:
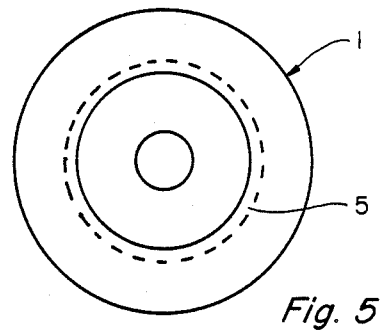
FIG. 5 shows a top view of the top cap.
Figure 4:
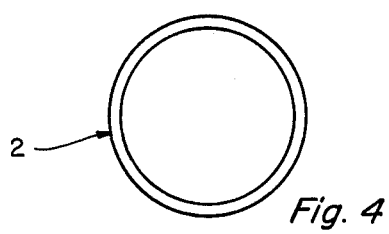
FIG. 4 shows a cross-section of the sightglass.
Figure 2:
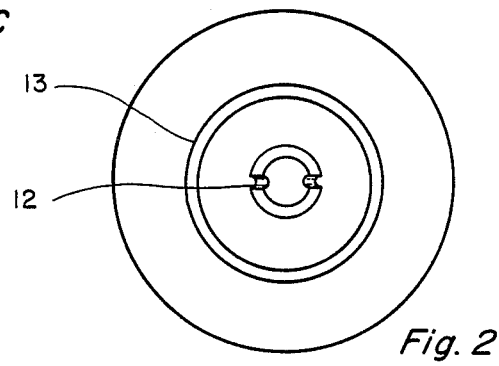
FIG. 2 shows a detailed view of the upper portion of the check-ball chamber, along Line C—C showing the longitudinal air channel tunnels.
Figure 3:
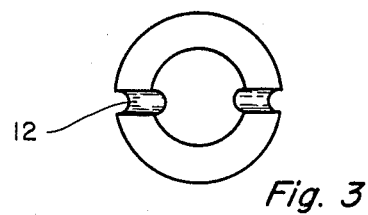
FIG. 3 shows a detail of the center of the check-ball chamber, indicating the longitudinal tunnels.

The tester comprises essentially 4 main parts: a cap (1), a sightglass (2), a nose-cone (3), and a check-ball (4). As can be seen in FIG. 1, the preferred embodiment of this invention includes an essentially cylindrical cap (1) which has a diameter greater than that of the sightglass. In practice, the diameter of the cap is about 2 inches, but it could vary depending on precise circumstances. While the cap is shown to be round, it could take other shapes, e.g. octagonal or square. The cap is manufactured from Monsanto santoprene thermoplastic rubber by injection molding. The preferrred embodiment of the cap has a funnel-like indentation (6) therein as shown in FIG. 1 to facilitate introduction of water during the test. An upper longitudinal passageway (7) located centrally through the cap is provided for the introduction of water into the device.

The sightglass (2) is made of transparent material, preferrably extruded plexiglas, and is friction fit into the cap. A small annular groove (5) with a cross-section slightly smaller than the thickness of the side of the sightglass is cut in the cap and the top of the sightglass is then inserted into the annular groove. In practice this friction fit has been determined to be sufficient to seal the connection but glue could be used to further reinforce the seal and connection. Other means of attaching the sightglass to the cap could be used as long as the connection is sealed and the embodiment related herein is not meant as a limitation on the scope of the invention.

The bottom nose-cone (3) is also made by injection molding. The nose-cone is made of Monsanto santoprene thermoplastic rubber. The nose-cone has two general portions, a frustro-conical lower portion and an essentially cylindrical upper portion. The lower portion has a lower longitudinal circular passageway (8). The upper portion of the nose-cone has a cylindrical check-ball chamber (9) that is larger than the lower passageway (8). The check-ball chamber has a diameter sufficient to allow the check-ball (4) to slide within the chamber. The lower end of the check-ball chamber has a downwardly pointed conical seat (10) that leads into the lower longitudinal passageway. The cone surface slopes at an approximately 60° angle so as to enable the device to be used on radiators having a side angle mounted filler cap. The upper end of the check-ball chamber has an upwardly pointed conical seat (11) to inhibit the check-ball from exiting the check-ball chamber at its upper end. In order to allow the passage of air bubbles through the lower longitudinal passageway and out the upper end of the check-ball when the check-ball has been forced upwardly against the surface of the upper conical seat, a plurality of longitudinal air channel tunnels (12) are cut into the surface of the upper check-ball seat. When air forces the check-ball upward against the upper conical seat, the air channel tunnels (12) allow the air to flow through the channels and out the top of the check-ball chamber into the sightglass.

In the preferred embodiment, the diameter of the cylindrical check-ball chamber is approximately one half inch. The diameter of the check-ball is approximately ⅜ inch so that the check ball can never entirely block passage of air out the upper end of the check-ball chamber. The check-ball is ideally made of stainless steel or nylon, but other suitable materials may be used. The entire structure of the nose-cone is manufactured by injection molding. The check-ball is manufactured separately and is inserted into the check-ball chamber by forcing it through the upper opening of the upper check-ball seat. Since the nose-cone is ideally made of thermoplastic, it is found that insertion of the check-ball by this method is satisfactory.

The nose-cone is connected to the bottom portion of the sightglass in the same method as the top cap was connected to the upper portion of the sightglass, i.e. friction fitting. An annular groove (13) is cut into the top of the nose cone having the same shape as the sightglass, again with a width slightly smaller than the width of the side of the sightglass. The bottom of the sightglass is inserted into the annular groove and a friction fit is accomplished. Gluing or other means of attachment could also be used.

The preferred embodiment described herein has been found to be the most cost-effective assembly for detecting the combustion chamber leaks. However, any suitable means for measuring an increase of pressure from the combustion chamber is acceptable and other measuring means will work equally as well. For example, the assembly could consist of a nose cone with the inlet side of a pressure guage attached to the top thereof fluidly connecting the radiator cavity to the inlet side of the pressure guage. Any suitable pressure guage could be used. The same principles would apply and the pressure guage would measure the increase in the pressure due to faulty gaskets or blocks. A chemical test solution could also be utilized wherein carbon monoxide would be detected by chemical means, said chemical test being run in the sight glass chamber.

In order to test an engine for combustion compartment leaks, the engine to be tested must be cool. The radiator cap is removed and the radiator cavity drained so that the water level of the radiator cavity is approximately two inches below the lower end of the filler neck. The tester is inserted into the filler neck and the engine is run for approximately five minutes with the test operator holding the test device in place so as to create an air-tight seal around the radiator filler neck. The sightglass is observed for the presense or absence of bubbles, indicating the condition of the engine, block, and seals.

It is an object of this invention to produce a useful, inexpensive device for the testing of internal combustion water cooled engines.

I claim:

1. A combustion leak tester for a radiator, comprising:
   (a) A transparent, hollow sightglass;
   (b) A means for attaching the bottom of said sightglass to the radiator filling -neck- mouth of a water-cooled internal combustion engine;
   (c) A means for prohibiting water flow downward from the sightglass to the radiator cavity while allowing combustion gas to flow upward therefrom;
   Whereby, when said tester is attached to the radiator filling mouth and when approximately 2 inches of water is drained from said radiator, combustion leaks in a running engine can be detected by observing the presence of bubbles in the water in the sightglass.

2. A combustion leak tester as in claim 1, wherein said attaching means is a frustro-conical bottom nose-cone having a longitudinal passageway therethrough.

3. A combustion leak tester for a radiator, comprising:
   (a) a top cap having an upper longitudinal passageway therethrough;
   (b) a transparent, hollow sightglass having a top sealedly attached to the bottom of said cap;
   (c) a bottom nose cone sealedly attached to the bottom of said sightglass comprising an upper portion having a cylindrical check-ball chamber therein containing a check-ball which prohibits water flow downward; said chamber further comprising at its upper end an upwardly pointed conical upper check-ball seat having a plurality of longitudinal air tunnels cut into the surface thereof and at its bottom end a downwardly pointed conical lower check-ball seat and a frustro-conical lower portion having a lower longitudinal passage fluidly connecting the lower end of the nose-cone to the interior of the sightglass;
   whereby when said tester is attached to the radiator filling mouth and when approximately 2 inches of water is drained from said radiator, combustion leaks in a running engine can be detected by observing the presense of bubbles in the water in the sightglass.

4. A combustion leak tester for a radiator as in claim 3, wherein the slope of said lower conical check-ball seat is approximately 60 degrees.

5. A combustion leak tester for a radiator as in claim 3, wherein the bottom of the hollow sightglass is embedded in said nose cone to a depth below the check-ball chamber thereby reinforcing the integrity of the shape of the chamber.

* * * * *